US008770817B2

(12) United States Patent
Yamanaka et al.

(10) Patent No.: US 8,770,817 B2
(45) Date of Patent: Jul. 8, 2014

(54) VIDEO DISPLAY DEVICE, BACKLIGHT UNIT, AND ELECTRONIC DEVICE

(75) Inventors: Satoru Yamanaka, Fukaya (JP); Kenichi Nozaki, Kumagaya (JP); Takuya Hirose, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 324 days.

(21) Appl. No.: 13/282,002

(22) Filed: Oct. 26, 2011

(65) Prior Publication Data

US 2012/0163030 A1 Jun. 28, 2012

(30) Foreign Application Priority Data

Dec. 24, 2010 (JP) .................................. 2010-288061

(51) Int. Cl.
*F21V 8/00* (2006.01)
*F21S 4/00* (2006.01)

(52) U.S. Cl.
USPC .......................................... 362/613; 362/631

(58) Field of Classification Search
CPC ............................ G02B 6/0083; G02B 6/0088
USPC ........... 349/62; 362/97.2, 97.3, 613, 630, 631
See application file for complete search history.

(56) References Cited

U.S. PATENT DOCUMENTS

2010/0103342 A1* 4/2010 Park et al. ....................... 349/61
2011/0075443 A1* 3/2011 Huang et al. .................. 362/606
2011/0273642 A1* 11/2011 Kweon et al. ................... 349/62

FOREIGN PATENT DOCUMENTS

| JP | 11-085092 A | 3/1999 |
|---|---|---|
| JP | 2001-013905 A | 1/2001 |
| JP | 2002-111249 A | 4/2002 |
| JP | 2004-134240 A | 4/2004 |
| JP | 2006-208722 A | 8/2006 |
| JP | 2007-240974 | 9/2007 |
| JP | 2009-176604 | 8/2009 |
| WO | WO 2012/023321 | 2/2012 |

OTHER PUBLICATIONS

Japanese Office Action for corresponding Japanese Application No. 2010-288061, dated Dec. 20, 2011 in 4 pages.
Decision to Grant a Patent for corresponding Japanese Application No. 2010-288061, dated Apr. 24, 2012, in 3 pages.

* cited by examiner

*Primary Examiner* — Karabi Guharay
(74) *Attorney, Agent, or Firm* — Knobbe, Martens, Olson & Bear, LLP

(57) ABSTRACT

According to one embodiment, a video display device includes a housing, a display module, a light guide, two first components, and two second components. The housing houses at least part of the display module. The light guide is located opposite the display screen of the display module with respect to the display module. The first and the second components each include a base portion, a plurality of light emitters, and a connector. The base portion is arranged along an edge of the light guide. The light emitters are arranged on the base portion to face the edge of the light guide. The connector includes a plurality of terminals including anode and cathode electrically connected to the light emitters. The terminals are arranged in the same sequence in the first components and in the second components.

15 Claims, 7 Drawing Sheets

VIDEO DISPLAY DEVICE, BACKLIGHT UNIT, AND ELECTRONIC DEVICE

CROSS-REFERENCE TO RELATED APPLICATIONS

This application is based upon and claims the benefit of priority from Japanese Patent Application No. 2010-288061, filed Dec. 24, 2010, the entire contents of which are incorporated herein by reference.

FIELD

Embodiments described herein relate generally to a video display device, a backlight unit, and an electronic device.

BACKGROUND

There have been known video display devices provided with a light guide plate and a plurality of light emitting diodes (LEDs) as a backlight. The light guide plate is located behind the display module, while the LEDs are located to face the side edge of the light guide plate.

If this type of video display device is provided with a plurality of components each having a plurality of LEDs, and if the components have different structures (specifications) depending on their locations, this may arise some inconvenience such as an increase in the number of components and manufacturing process.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a video display device comprises a housing, a display module, a light guide, two first components, and two second components. The display module comprises a display screen and is configured to be at least partly housed in the housing. The light guide is located opposite the display screen with respect to the display module. The two first components each comprise a base portion, a plurality of light emitters, and a connector. The base portion is arranged along an edge of the light guide. The light emitters are arranged on the base portion to face the edge of the light guide. The connector comprises a plurality of terminals including anode and cathode configured to be electrically connected to the light emitters. The terminals are arranged in an identical sequence in the first components. The two second components each comprise a base portion, a plurality of light emitters, and a connector. The base portion is arranged along an edge of the light guide. The light emitters are arranged on the base portion to face the edge of the light guide. The connector comprises a plurality of terminals including anode and cathode configured to be electrically connected to the light emitters. The terminals are arranged in an identical sequence in the second components.

Exemplary embodiments will be described in detail below with reference to the accompanying drawings, in which, for the sake of convenience, directions are defined as follows: X direction indicates the left direction in the front view of the display screen (the right direction in the back view); Y direction indicates the up direction; and Z direction indicates the normal direction of the display screen.

Figure 1:
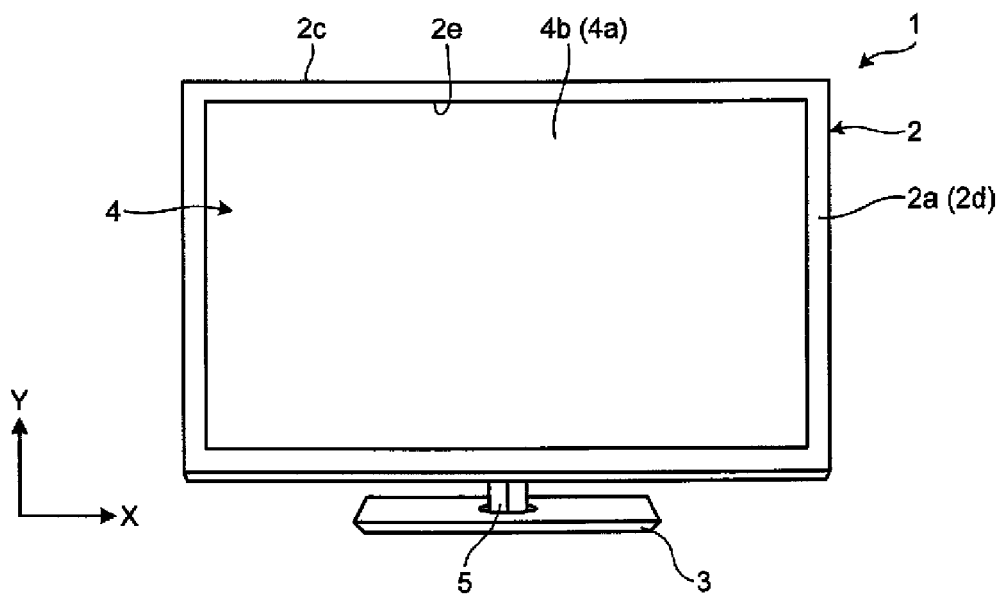
FIG. 1 is an exemplary front view of a video display device according to an embodiment.
Figure 2:
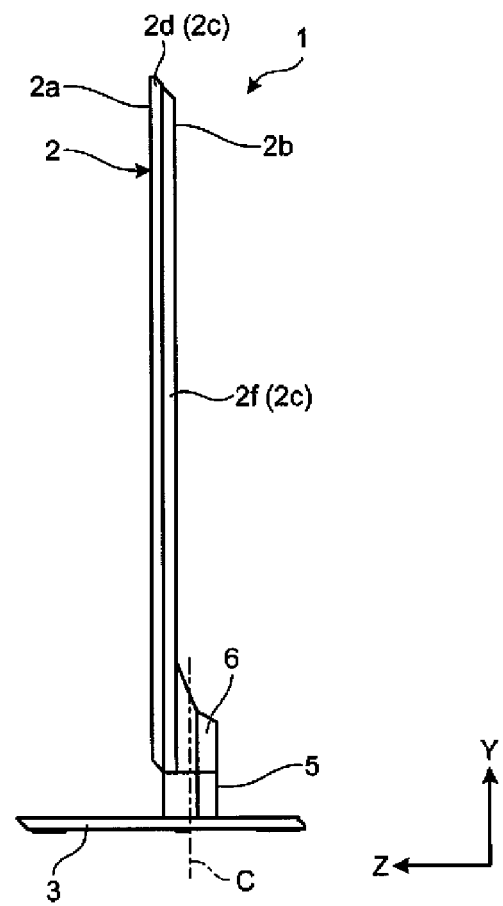
FIG. 2 is an exemplary side view of the video display device in the embodiment.

As illustrated in FIGS. 1 and 2, a video display device 1 of an embodiment will be described by way of example as a television receiver. The video display device 1 comprises a base 3 and a relatively thin flat rectangular main body 2. The main body 2 is supported on the base 3 via a leg 5 and an attachment portion 6. The main body 2 comprises a housing 2c on a front surface 2a of which is provided a rectangular opening 2e. The housing 2c houses therein a display module 4 (a display unit 8) having a display screen 4a that is exposed from the opening 2e. The display module 4 may be, for example, a liquid crystal display (LCD) panel or an organic electroluminescent display (GELD) panel.

For example, the housing 2c is formed of a combination of parts such as a front mask 2d on the front surface 2a side and a back cover 2f on the side of a back surface 2b. The attachment portion 6 protrudes from the back surface 2b toward the back, and is supported by the leg 5 to be rotatable about the rotation axis C.

Figure 3:
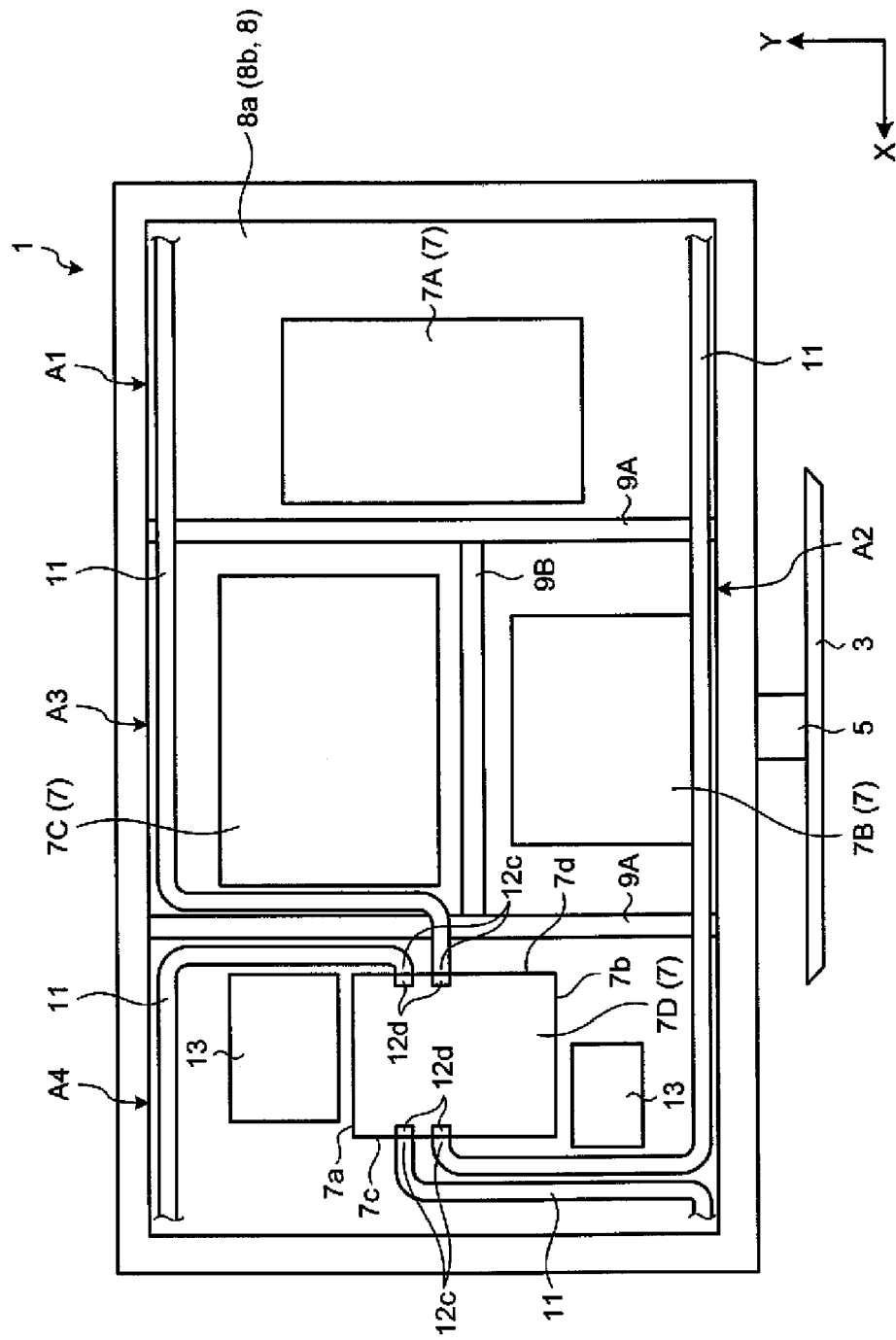
FIG. 3 is an exemplary back view of the video display device without a back cover in the embodiment.

As illustrated in FIG. 3, a plurality of circuit boards 7 (7A to 7D) are attached by fasteners such as screws (not illustrated) onto a back surface 8a of the display unit 8 including the display module 4. The circuit boards 7 are each fixed on a boss (not illustrated) protruding on the back surface 8a. Thus, there is a space between the circuit boards 7 and the back surface 8a.

The back surface 8a of the display unit 8 corresponds to a back plate 8b that is provided with two frames 9A and a frame 9B. The frames 9A are spaced apart in the horizontal direction and extend in the vertical direction. The frame 9B is a bridge between the vertical centers of the frames 9A and extends in the horizontal direction. The frames 9A and 9B protrude toward the opposite of the display screen 4a, i.e., on the back surface 8a. The frames 9A and 9B are portions (reinforcement portions, frame portions) that structurally reinforce the display unit 8. The frames 9A and 9B may be formed by partly bending the back plate 8b by pressing or the like, or by adding other parts. The frames 9A and 9B may also be formed by partly bending the back plate 8b and then adding other parts.

Figure 4:
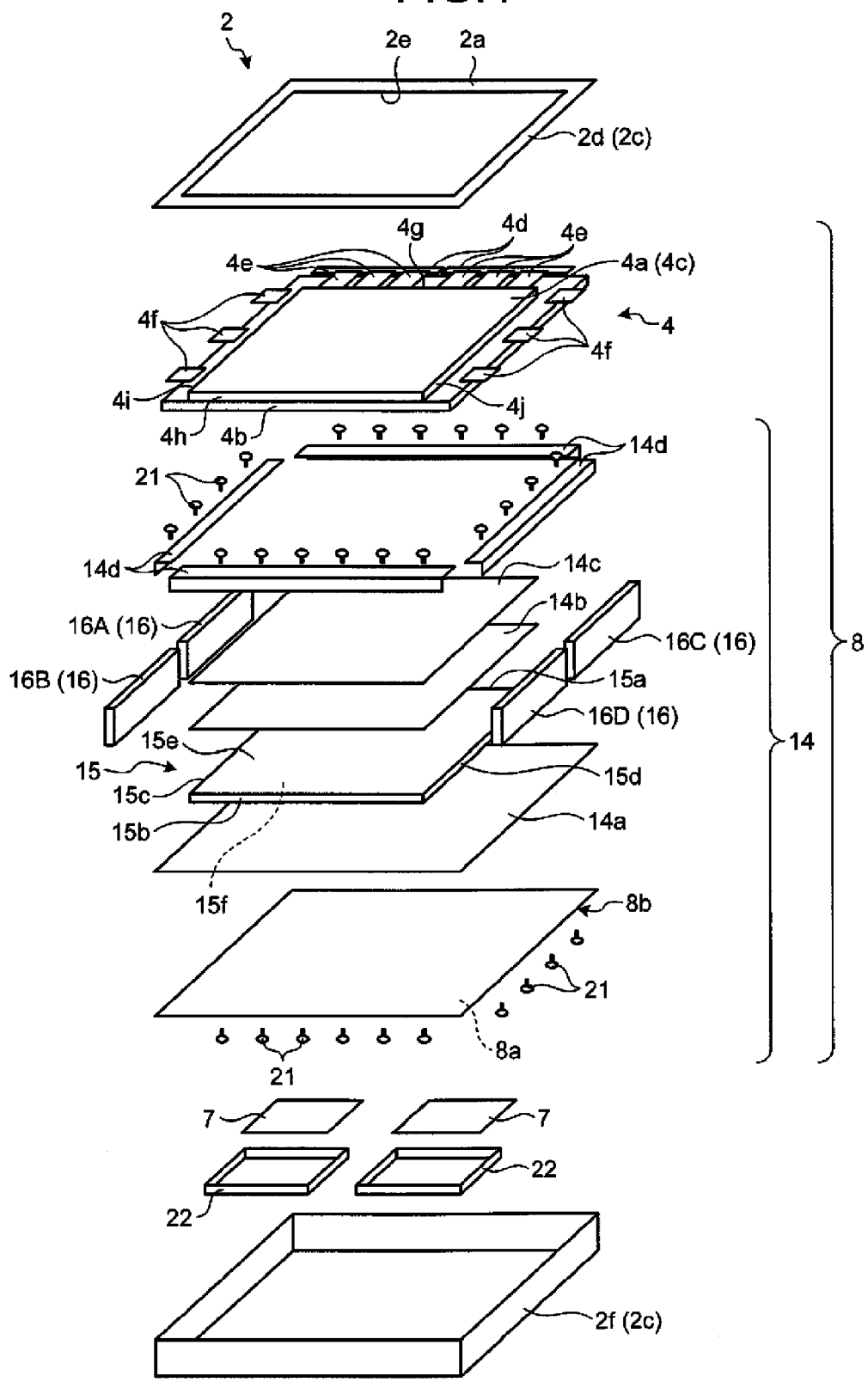
FIG. 4 is an exemplary schematic exploded perspective view of a portion of the main body of the video display device in the embodiment.

In the example of FIG. 3, the frames 9A and 9B are connected in an H-shape. The frames 9A and 9B divide the back surface 8a of the display unit 8 into areas A1 to A4. In the back view (i.e., in the view of FIG. 3), the area A1 is located on the right side of the right frame 9A, the areas A2 and A3 are located below and above the frame 9B, respectively, in the horizontal center, and the area A4 is located on the left side of the left frame 9A. In FIG. 3, the circuit boards 7A to 7D are installed in the areas A1 to A4, respectively. Incidentally, as illustrated in FIG. 4, each of the circuit boards 7 may be covered with a shield case 22.

The circuit board 7A in the right area A1 is provide with, for example, a tuner, a connector for external connection, and the like (all not illustrated). The circuit of the circuit board 7A processes a signal received via the tuner, the connector, or the like, and outputs video data, audio data, and the like.

The circuit board 7B in the lower horizontal center area A2 is provided with a frame rate control (FRC) circuit, a timing control (TCON) circuit, and the like. In the circuit board 7B, the FRC circuit is arranged above the TCON circuit. Although not illustrated, a gate drive circuit that drives the display module 4 is provided at a position along the lower edge of the display module 4 below the circuit board 7B.

The circuit board 7C in the upper horizontal center area A3 is provided with a power source circuit and the like. The arrangement of the power source circuit in the horizontal center area achieves a shorter power supply cable (not illustrated) that is routed between the circuit board 7C and the circuit boards 7A, 7B, and 7D. Further, the arrangement of the circuit board 7C on the upper side allows heat generated by the power source circuit to be discharged upward easier compared to the case where the circuit board 7C is arranged on the lower side. This facilitates to suppress the influence of the heat on other parts (for example, the circuit boards 7A, 7B, and 7D).

Figure 6:
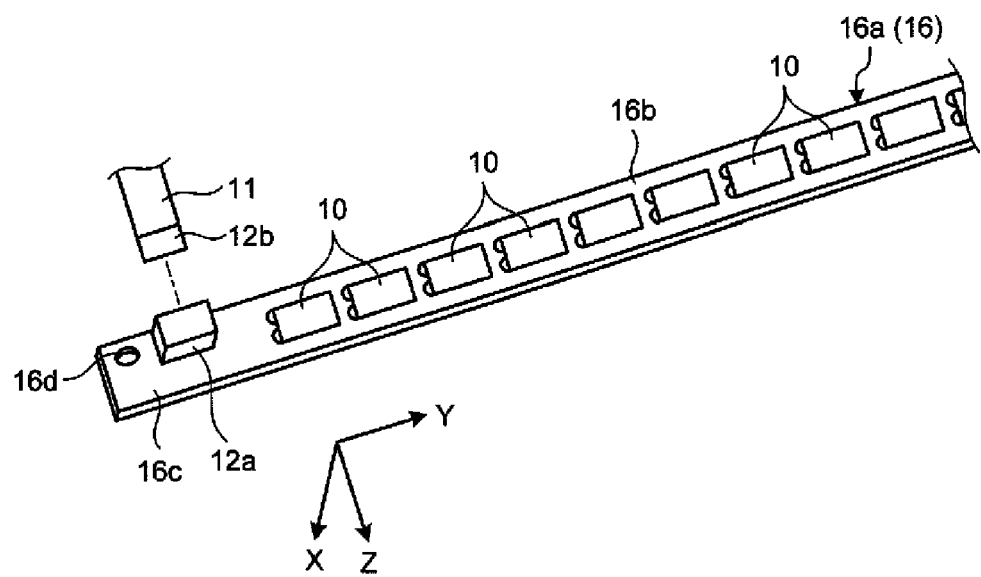
FIG. 6 is an exemplary perspective view of a component of the video display device in the embodiment.

The circuit board 7D in the left area A4 is provide with a drive circuit that controls the light emission of a plurality of light emitters 10 such as, for example, light emitting diodes (LEDs) and the like (see FIG. 6). The circuit board 7D is also provided with connectors 12d. Flat cables 11 that may be, for example, flexible printed circuits (FPC) or flexible flat cables (FFCs) have connectors 12c configured to be connected to the connectors 12d, respectively. The use of the flat cables 11 as wiring between the light emitters 10 and the circuit board 7D facilitates to reduce the manufacturing process and cost compared to the use of individually independent wirings, twisted wires, or the like.

Components 13 are arranged above and below the circuit board 7D, respectively. To avoid interference between the components 13 and the flat cables 11, the connectors 12d are provided not to upper and lower edges 7a and 7b of the circuit board 7D but to left and right edges 7c and 7d thereof.

As illustrated in FIG. 4, in the embodiment, the housing 2c comprises the front mask 2d and the back cover 2f. The housing 2c houses therein the display unit 8 comprising the display module 4 and a backlight 14. After the backlight 14 is assembled into a backlight unit, the backlight unit (the backlight 14) may be assembled with the display module 4 to form the display unit 8. Parts are assembled with screws 21.

The display module 4 comprises a base portion 4b, a panel 4c, a source board 4d, a source chip-on-film (COF) 4e, a gate COF 4f, and the like.

The backlight 14 comprises the back plate 8b, a reflective layer 14a, a light guide 15, a prism layer 14b, a polarization layer 14c, a frame 14d, components 16, and the like. All the back plate 8b, the reflective layer 14a, the light guide 15, the prism layer 14b, and the polarization layer 14c have a flat rectangular shape in the front view, and are layered in the order as illustrated in FIG. 4.

In the embodiment, among edges 15a to 15d of the light guide 15, the components 16 each having the light emitters 10 (see FIG. 7) are located along the edges 15c and 15d facing each other on horizontally opposite sides such that they are spaced apart from the edges 15c and 15d, respectively. Among edges 4g to 4j of the display module 4, the edges 15c and 15d extend along edges 4i and 4j facing each other on horizontally opposite sides, i.e., left and right sides (see FIG. 4). Accordingly, the components 16 also extend along the edges 4i and 4j of the display module 4.

As illustrated in FIG. 6, the light emitters 10 provided to each of the components 16 are arranged along a base portion 16a of the component 16. In other words, as can be seen from FIG. 5, the light emitters 10 are arranged, for example, in a line along the edges 15c and 15d. The light emitters 10 are located on the base portion 16a of the component 16 to face the edges 15c and 15d. Accordingly, the light emitted from the light emitters 10 enters the plate-like light guide 15 from the edges 15c and 15d thereof and is emitted from a front surface 15e. The reflective layer 14a is located on the side of a back surface 15f. With this, the light emitted from the back surface 15f is reflected on the reflective layer 14a, returns into the light guide 15, and is emitted from the front surface 15e. The light emitted from the front surface 15e passes though the prism layer 14b and the polarization layer 14c and illuminates the back surface of the display module 4 (the display screen 4a) as backlight. The frame 14d is made of a material with relatively high rigidity (for example, metal material, etc.), and functions as the housing of the backlight 14 and the display unit 8 together with the back plate 8b and the frames 9A and 9B.

Figure 5:
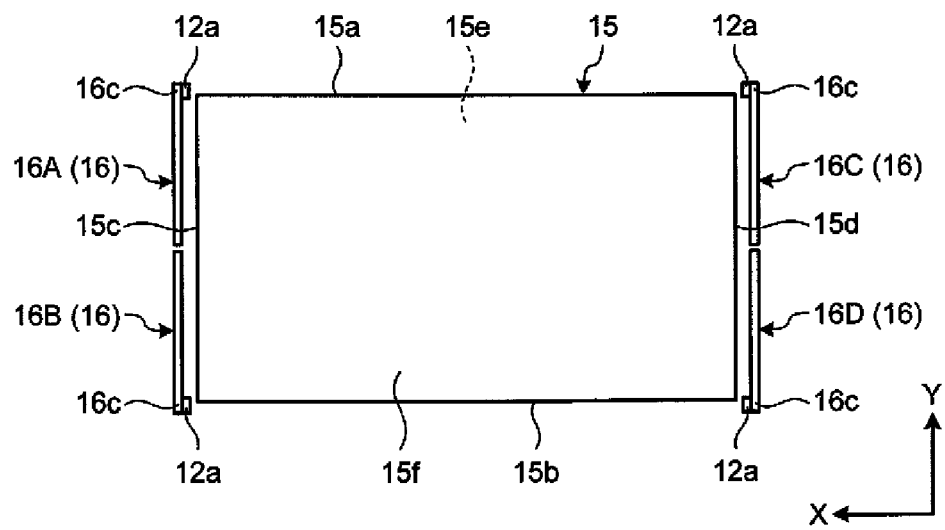
FIG. 5 is an exemplary schematic back view illustrating the arrangement of a light guide and a plurality of components of the video display device in the embodiment.

As illustrated in FIGS. 4 and 5, in the embodiment, the two components 16 are located along each of the edges 15c and 15d facing each other on horizontally opposite sides of the rectangular light guide 15. Namely, there are provided a total of the four components 16. As illustrated in FIG. 6, the components 16 each comprise the base portion 16a, the light emitters 10, and a connector 12a. The light emitters 10 and the connector 12a are, for example, soldered onto a surface 16b of the base portion 16a that faces the edge 15c or 15d of the light guide 15. The base portion 16a is made of a material with relatively high thermal conductivity, such as, for example, aluminum alloy. On the base portion 16a are layered an insulating layer and a conductive layer, which forms a conductor pattern (not illustrated). The conductor pattern forms a circuit 18 (see FIG. 7) in which terminals 17p and 17m of the connector 12a are electrically connected to the light emitters 10. The base portion 16a is provided with a through hole 16d for screwing at an end 16c in the longitudinal direction.

The connector 12a of the embodiment is located at the end 16c of the base portion 16a in the longitudinal direction. The connectors 12a of the respective components 16 are arranged on both ends in the longitudinal direction of the edges 15c and 15d of the light guide 15, along which the components 16 are arranged.

In the embodiment, at least components 16A and 16D located in diagonal positions in FIG. 5 have the same specifications, while components 16B and 16C have the same specifications. That is, in the embodiment, the video display device 1 is provided with the four components 16 of two specifications (types). Those with one of the specifications correspond to the first component, while those with the other specifications correspond to the second component. In this manner, according to the embodiment, the same components 16 are used at a plurality of positions. This reduces the number of the components 16, and thereby reduces the manufacturing process of the components 16, resulting in less manufacturing cost.

More specifically, with respect to the components 16A and 16D, the arrangement of the terminals 17p and 17m is the same in the connector 12a (see FIG. 7), the arrangement of the light emitters 10 corresponding to the terminals 17p and 17m is the same in the base portion 16a (see FIG. 7), and the position of the connector 12a is the same relative to the base portion 16a (see FIG. 5). With respect to the components 16A and 16D, also, the arrangement of the terminals 17p and 17m is the same in the connector 12a, the arrangement of the light emitters 10 corresponding to the terminals 17p and 17m is the same in the base portion 16a, and the position of the connector 12a is the same relative to the base portion 16a. By arranging the terminals 17p and 17m in the same manner in the plurality of components 16, the flat cables 11 of the same specifications can be used, and the terminals can be arranged in the same sequence in the plurality of connectors 12d of the circuit board 7D.

Figure 7:
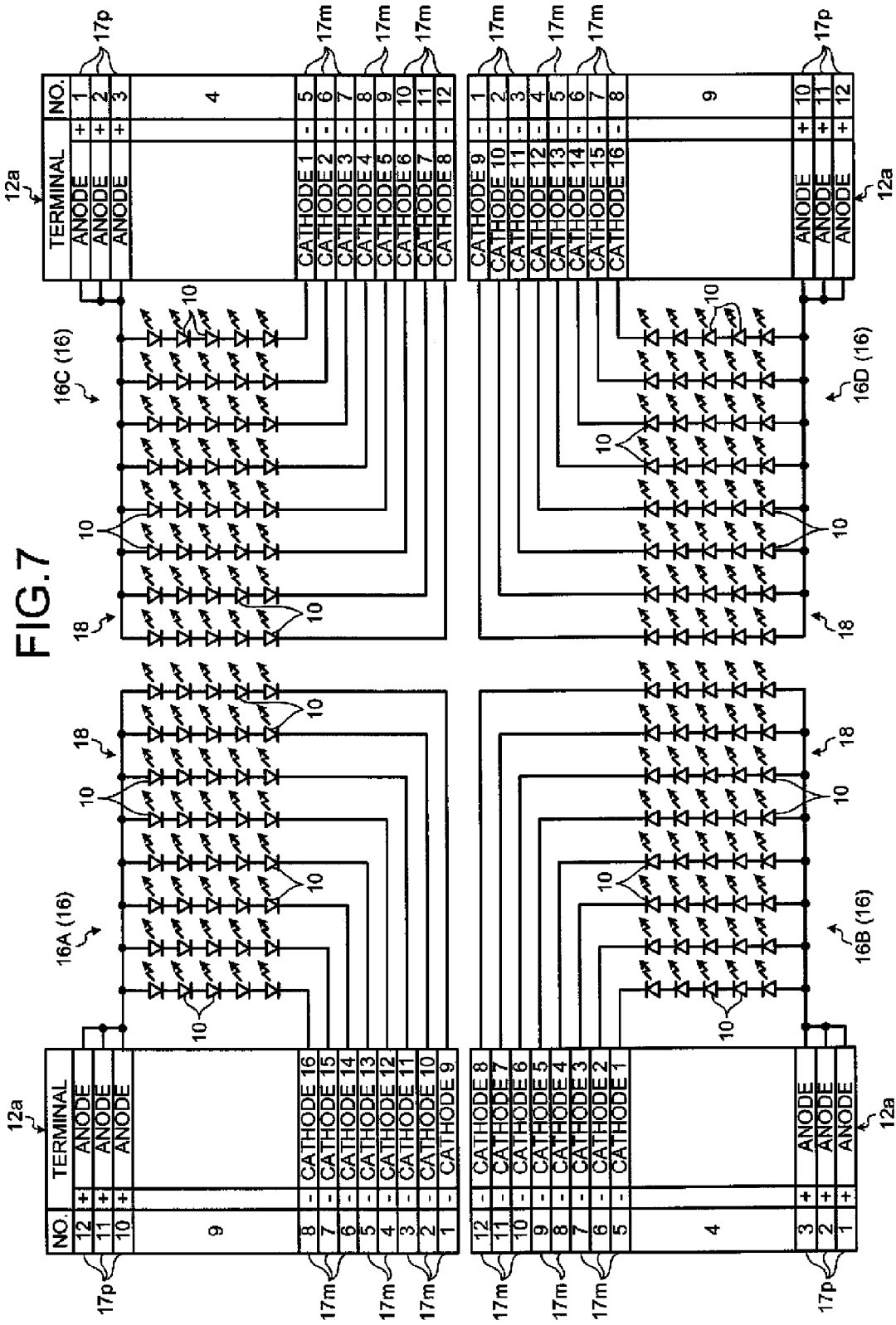
FIG. 7 an exemplary schematic diagram for explaining the circuit structure and the arrangement of connector terminals in the components in the embodiment.

FIG. 7 illustrates the arrangement of the terminals 17p and 17m of the connectors 12a of the four components 16A to 16D arranged as illustrated in FIG. 5. As illustrated in FIG. 7, with respect to all the four components 16A to 16D, the anode terminals 17p are located at the end sides in the longitudinal direction of the facing edges 15c and 15d in the connectors 12a. More specifically, with respect to the components 16A and 16C, the anode terminals 17p are located at the upper end sides of the edges 15c and 15d. With respect to the components 16B and 16D, the anode terminals 17p are located at the lower end sides of the edges 15c and 15d. The cathode terminals 17m are located on the opposite sides of the anode terminals 17p. In the embodiment, the connectors 12a of all the four components 16 each have, for example, the three anode terminals 17p and the eight cathode terminals 17m. The three anode terminals 17p are electrically connected to one another. There are provided eight parallel wirings (conductor pattern) between the anode terminals 17p and the respective cathode terminals 17m. Each wiring is provided with the five light emitters 10. That is, in the embodiment, the components 16 are each provided with the 40 light emitters 10. The light emission (turning on/off) of the light emitters 10 is controlled with respect to each of the cathode terminals 17m. Either one of the anode and the cathode corresponds to the first electrode and the other corresponds to the second electrode.

Since the components 16A and 16C have the same specifications (structure), the light emitters 10 corresponding to the terminals 17p and 17m are arranged in the same manner on the base portion 16a. For example, in the case of the component 16A, the light emitters 10 electrically connected to the cathode terminal 17m with pin number 1 are arranged on the center side of the facing edge 15c (i.e., in the vertical center of FIG. 5). The light emitters 10 corresponding to a larger pin number are arranged on the end side of the edge 15c in the longitudinal direction (i.e., on the upper side of FIG. 5). In the case of the component 16D also, the light emitters 10 electrically connected to the cathode terminal 17m with pin number 1 are arranged on the center side of the facing edge 15c (i.e., in the vertical center of FIG. 5). The light emitters 10 corresponding to a larger pin number are arranged on the end side of the edge 15c in the longitudinal direction (i.e., on the lower side of FIG. 5).

In the embodiment, if the component 16A is rotated 180° along the plane of FIG. 5 (i.e., the XY plane, the plane along the display screen 4a and the back surface 8a, the plane perpendicular to the surface of the base portion 16a where the light emitters 10 are arranged and along the longitudinal direction of the base portion 16a), it matches the component 16D. In other words, the components 16A and 16D are a pair of the components 16 that can be replaced with each other. The same applies to the components 16B and 16C. Namely, the components 16B and 16C are a pair of the components 16 that can be replaced with each other. It is effective to use the same components 16 in the state where they are rotated 180° with respect to each other along the XY plane at a plurality of positions if the components 16 cannot be used in the state where the front (front surface side) and back (back surface side) are reversed in the normal direction of the display screen 4a, as, for example, if the components 16 are not symmetrical with respect to the XY plane. If the components 16 can be used in the state where the front (front surface side) and back (back surface side) are reversed in the normal direction of the display screen 4a without any problem on the light emission of the light emitters 10, connection between the flat cables 11 and the connectors 12a, or the like, they can be used in different postures (the postures of FIG. 5, the front and back may be reversed) at four positions illustrated in FIG. 5.

Figure 8:
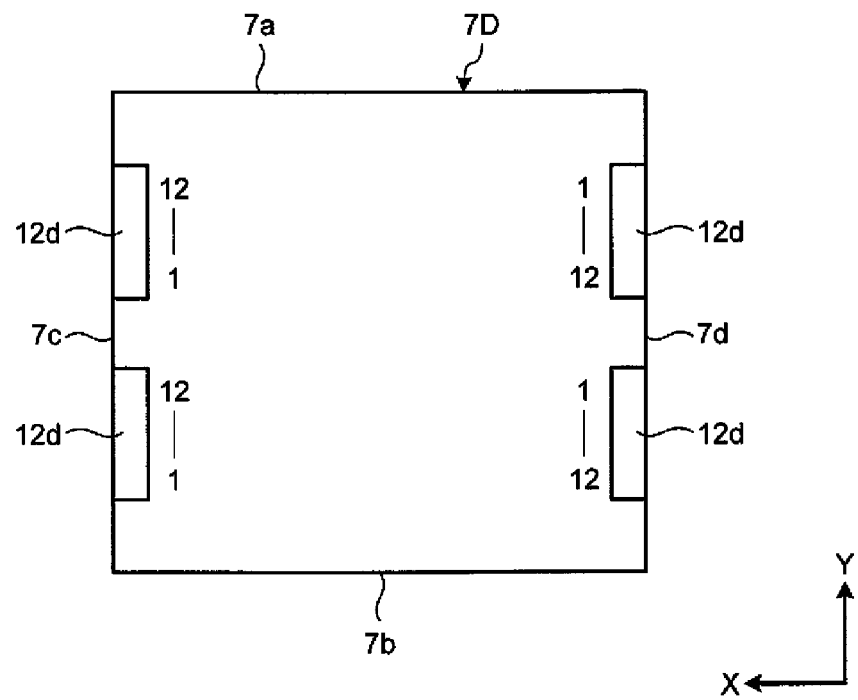
FIG. 8 is an exemplary schematic back view illustrating the arrangement of the fourth connector in a circuit board of the video display device in the embodiment.

FIG. 8 illustrates an example of the arrangement of the terminals (not illustrated) of the connectors 12d provided to the circuit board 7D. Regarding the two connectors 12d located at the edge 7c of the circuit board 7D on the left side in FIG. 8, the pin number increases from the bottom to the top. The terminals of upper one of the two connectors 12d are connected to the terminals 17p and 17m of the connector 12a on the lower left side in FIG. 7 via wiring (not illustrated) in the flat cable 11. The terminals of the lower one of the connectors 12d are connected to the terminals 17p and 17m of the connector 12a on the lower right side in FIG. 7 via wiring in the flat cable 11. As illustrated in FIG. 7, in the lower left connector 12a, the pin number increases from the bottom to the top. Meanwhile, in the lower right connector 12a, the pin number increases from the top to the bottom. As illustrated in FIG. 3, the flat cable 11 that is connected to the lower connector 12d is routed in a U-shape such that the vertical order of wiring is reversed. Accordingly, it is possible to connect the terminals of the connector 12d of the circuit board 7D and the terminals 17p and 17m of the connector 12a of the component 16D where their arrangement sequence is vertically reversed. On the other hand, the flat cable 11 that is connected to the upper connector 12d is routed in an S-shape or I-shape such that the vertical order of wiring is not reversed. Accordingly, it is possible to connect the terminals of the connector 12d of the circuit board 7D and the terminals 17p and 17m of the connector 12a of the component 16B where their arrangement sequence is vertically the same.

Regarding the two connectors 12d located at the edge 7d of the circuit board 7D on the right side in FIG. 8, the pin number increases from the top to the bottom. The terminals of upper one of the two connectors 12d are connected to the terminals 17p and 17m of the connector 12a on the upper left side in FIG. 7 via wiring (not illustrated) in the flat cable 11. The terminals of the lower one of the connectors 12d are connected to the terminals 17p and 17m of the connector 12a on the upper right side in FIG. 7 via wiring in the flat cable 11. As illustrated in FIG. 7, in the upper left connector 12a, the pin number increases from the bottom to the top. Meanwhile, in the upper right connector 12a, the pin number increases from the top to the bottom. As illustrated in FIG. 3, the flat cable 11 that is connected to the upper connector 12d is routed in a U-shape such that the vertical order of wiring is reversed. Accordingly, it is possible to connect the terminals of the connector 12d of the circuit board 7D and the terminals 17p and 17m of the connector 12a of the component 16A where their arrangement sequence is vertically reversed. On the other hand, the flat cable 11 that is connected to the lower connector 12d is routed in an S-shape or I-shape such that the vertical order of wiring is not reversed. Accordingly, it is possible to connect the terminals of the connector 12d of the circuit board 7D and the terminals 17p and 17m of the connector 12a of the component 16C where their arrangement sequence is vertically the same. As described above, according to the embodiment, the flat cables 11 are arranged as being bent in the in-plane direction along the back surface 8a without twisted. With this, the connectors 12a and 12d with reverse terminal arrangement sequence can be connected by the flat cable 11. Besides, according to the embodiment, the components 16A and 16D having the same specifications are located in diagonal positions. Meanwhile, the components 16B and 16C having the same specifications with the arrangement sequence of the terminals 17p and 17m being reversed from that of the components 16A and 16D are located in diagonal positions. Further, the flat cables 11 are arranged as being bent in the in-plane direction. Thus, the plurality of flat cables 11 can be arranged not to overlap each other.

Figure 9:
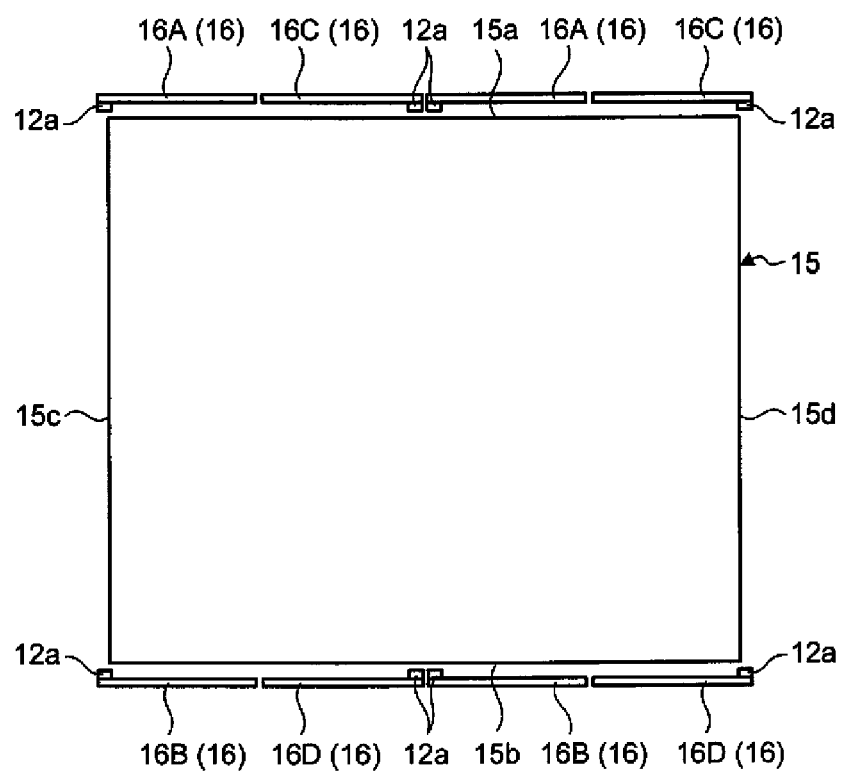
FIG. 9 is another exemplary schematic back view illustrating the arrangement of the light guide and the components of the video display device in the embodiment.

As a modification illustrated in FIG. 9, the components 16 may be arranged to face the upper and lower edges 15a and 15b of the light guide 15. In addition, the number of the components 16 is not limited to four, there may be a different number of them. In the modification illustrated in FIG. 9, the components 16A and 16D have the same specifications, while the components 16B and 160 have the same specifications. This reduces the number of the components 16, and thereby reduces the manufacturing process of the components 16, resulting in less manufacturing cost.

Figure 10:
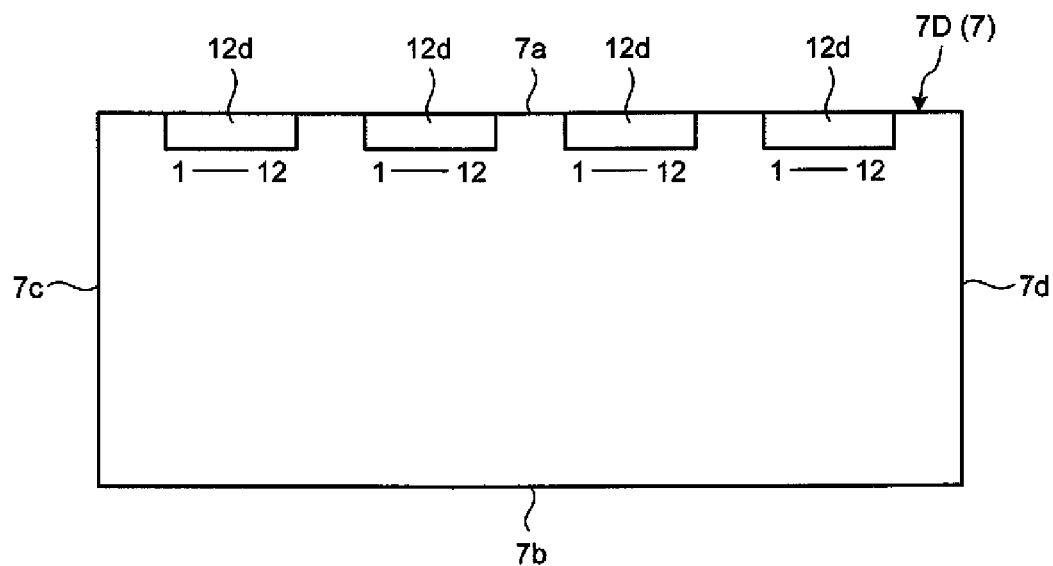
FIG. 10 is another exemplary schematic back view illustrating the arrangement of the fourth connector in the circuit board of the video display device in the embodiment.

As a modification illustrated in FIG. 10, the connectors 12d may be arranged at the upper edge 7a of the circuit board 7D, or may be arranged at the other edge 7b, 7c, or 7d. Further, the connectors 12d may be arranged separately at the plurality of edges 7a to 7d. In the example of FIG. 10, terminal arrangement sequence is the same in all the connectors 12d. In this case, for example, the leftmost connector 12d in FIG. 10 is connected to the connector 12a of the lower right component 16D in FIG. 7 via the flat cable 11. The second connector 12d from the left in FIG. 10 is connected to the connector 12a of the lower left component 16B in FIG. 7 via the flat cable 11. The second connector 12d from the right in FIG. 10 is connected to the connector 12a of the upper left component 16A in FIG. 7 via the flat cable 11. The rightmost connector 12d in FIG. 10 is connected to the connector 12a of the upper right component 16C in FIG. 7 via the flat cable 11.

Figure 11:
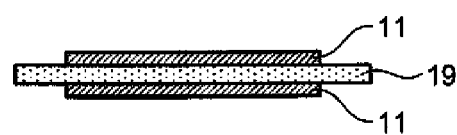
FIG. 11 is an exemplary schematic cross-sectional view of a plurality of flat cables overlapped in the thickness direction of the video display device according to a modification of the embodiment.

Referring to a modification illustrated in FIG. 11, the plurality of flat cables 11 overlap in the thickness direction with an insulator (shield) 19 as an interposer between them. If the flat cables 11 are overlapped in the thickness direction because of the location of the connectors 12d, the layout of the components in the housing 2c, or the like, the insulator 19 is interposed between them as illustrated in FIG. 11. With this, it is possible to avoid the malfunction of the light emitters 10 due to signal leakage or the like.

While the above embodiment is described as being applied to the video display device as an electronic device provided with a display unit comprising a display module and a backlight unit, it may also be applied to other electronic devices such as a personal computer provided with the same display unit. Besides, regarding the video display device, the electronic device, the backlight unit, the housing, the display module, the light guide, the component, the light emitter, the connector, the circuit board, and the like, the specifications (structure, shape, size, length, width, thickness, height, number, arrangement, location, material, etc.) can be suitably modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video display device comprising:
   a housing;
   a display module comprising a display screen, the display module configured to be at least partly housed in the housing;
   a light guide opposite the display screen with respect to the display module, and comprising a first edge and a second edge parallel to each other;
   a first light emitting unit facing the first edge, positioned along the first edge, comprising a first terminal and a second terminal, and not being a plane symmetric with respect to a plane parallel to the display screen;
   a second light emitting unit facing the first edge, positioned along the first edge, comprising a third terminal and a fourth terminal, and not being a plane symmetric with resect to a plane parallel to the display screen, wherein
      the second terminal and the third terminal are positioned closer to each other, and
      the first terminal and the fourth terminal are positioned farther from each other;
   a third light emitting unit facing the second edge, positioned along the second edge, comprising a fifth terminal and a sixth terminal, and not being a plane symmetric with respect to a plane parallel to the display screen; and
   a fourth light emitting unit facing the second edge, positioned along the second edge, comprising a seventh terminal and an eighth terminal, and not being a plane symmetric with respect to a plane parallel to the display screen, wherein
      the sixth terminal and the seventh terminal are positioned closer to each other, and
      the fifth terminal and the eight terminal are positioned farther from each other, wherein
   a shape of the first light emitting unit and a shape of the fourth light emitting unit are identical to each other,
   the shape of the first light emitting unit and a shape of the second light emitting unit are different from each other,
   the shape of the second light emitting unit and a shape of the third light emitting unit are identical to each other,
   the first light emitting unit opposes the third light emitting unit, and
   the second light emitting unit opposes the fourth light emitting unit.

2. The video display device of claim 1, further comprising:
   a first connector provided to the first light emitting unit, and comprising the first terminal and the second terminal;

a second connector provided to the second light emitting unit, and comprising the third terminal and the fourth terminal;
a third connector provided to the third light emitting unit, and comprising the fifth terminal and sixth terminal;
a fourth connector provided to the fourth light emitting unit, and comprising the seventh terminal and the eight terminal;
a first flat cable comprising the first connector and a fifth connector opposite the first connector;
a second flat cable comprising the second connector and a sixth connector opposite the second connector;
a third flat cable comprising the third connector and a seventh connector opposite the third connector;
a fourth flat cable comprising the fourth connector and a eighth connector opposite the fourth connector; and
a circuit board comprising a ninth connector configured to connect to the fifth connector, a tenth connector configured to connect to the sixth connector, an eleventh connector configured to connect to the seventh connector, and a twelfth connector configured to connect to the eight connector, the circuit board being configured to supply power to the first light emitting unit, the second light emitting unit, the third light emitting unit, and the fourth light emitting unit.

3. The video display device of claim 2, wherein two of the ninth connector, the tenth connector, the eleventh connector and the twelfth connector are provided to one edge of the circuit board, and other two of the ninth connector, the tenth connector, the eleventh connector and the twelfth connector are provided to other edge of the circuit board opposite the one edge of the circuit board.

4. The video display device of claim 2, wherein the ninth connector, the tenth connector, the eleventh connector and the twelfth connector are provided to one edge of the circuit board.

5. The video display device of claim 2, further comprising at least one interposer between at least two of the first flat cable, the second flat cable, the third flat cable, and the fourth flat cable in a thickness direction thereof.

6. The video display device of claim 1, wherein
the first terminal and the second terminal are positioned at one end in a longitudinal direction of the first light emitting unit,
the third terminal and the fourth terminal are positioned at one end in a longitudinal direction of the second light emitting unit,
the fifth terminal and the sixth terminal are positioned at one end in a longitudinal direction of the third light emitting unit, and
the seventh terminal and the eighth terminal are positioned at one end in a longitudinal direction of the fourth light emitting unit.

7. The video display device of claim 6, wherein the one end of the first light emitting unit, the one end of the second light emitting unit, the one end of the third light emitting unit, and the one end of the fourth light emitting unit are positioned at corners of the video display device, respectively.

8. The video display device of claim 1, wherein
the first terminal and the second terminal are positioned near an edge of the first light emitting unit at a side opposite the display screen,
the third terminal and the fourth terminal are positioned near an edge of the second light emitting unit at a side opposite the display screen,
the fifth terminal and the sixth terminal are positioned near an edge of the third light emitting unit at a side opposite the display screen, and
the seventh terminal and the eighth terminal are positioned near an edge of the fourth light emitting unit at a side opposite the display screen.

9. The video display device of claim 1, wherein
the first light emitting unit and the second light emitting unit are positioned adjacent to each other along the first edge, and
the third light emitting unit and the fourth light emitting unit are positioned adjacent to each other along the second edge.

10. The video display device of claim 1, wherein each of the planes is defined at the middle of the respective first, second, third, and fourth light emitting units in the width direction thereof.

11. A backlight unit comprising:
a light guide comprising a first edge parallel to each other;
a first light emitting unit facing the first edge, positioned along the first edge, comprising a first terminal and a second terminal, and not being a plane symmetric with respect to a plane parallel to a display screen;
a second light emitting unit facing the first edge, positioned along the first edge, comprising a third terminal and a fourth terminal, and not being a plane symmetric with respect to a plane parallel to the display screen, wherein
the second terminal and the third terminal are positioned closer to each other, and
the first terminal and the fourth terminal are positioned farther from each other;
a third light emitting unit facing the second edge, positioned along the second edge, comprising a fifth terminal and a sixth terminal, and not being plane symmetric with respect to a plane parallel to the display screen; and
a fourth light emitting unit facing the second edge, positioned along the second edge, comprising a seventh terminal and an eighth terminal, and not being plane symmetric with respect to a parallel to the display screen, wherein
the sixth terminal and the seventh terminal are positioned closer to each other, and
the fifth terminal and the eight terminal are positioned farther from each other, wherein
a shape of the first light unit and a shape of the fourth light emitting unit are identical to each other,
the shape of the first light emitting unit and a shape of the second light emitting unit are different from each other,
the shape of the second light emitting unit and a shape of the third light emitting unit are identical to each other,
the first light emitting unit opposes the third light emitting unit, and
the second light emitting unit opposes the fourth light emitting unit.

12. The backlight unit of claim 11, wherein
the first light emitting unit and the second light emitting unit are positioned adjacent to each other along the first edge, and
the third light emitting unit and the fourth light emitting unit are positioned adjacent to each other along the second edge.

13. The backlight unit of claim 11, wherein each of the planes is defined at the middle of the respective first, second, third, and fourth light emitting units in the width direction thereof.

14. An electronic device comprising:
a housing;

a display module comprising a display screen, the display module configured to be at least partly housed in the housing;

a light guide located opposite the display screen with respect to the display module, and comprising a first edge and a second edge parallel to each other;

a first light emitting unit facing the first edge, positioned along the first edge, and comprising a first terminal and a second terminal;

a second light emitting unit facing the first edge, positioned along the first edge, and comprising a third terminal and a fourth terminal, wherein
the second terminal and the third terminal are positioned closer to each other, and
the first terminal and the fourth terminal are positioned farther from each other; and a third light emitting unit facing the second edge, positioned along the second edge, and comprising a fifth terminal and a sixth terminal;

a fourth light emitting unit facing the second edge, positioned along the second edge, and comprising a seventh terminal and an eighth terminal, wherein
the sixth terminal and the seventh terminal are positioned closer to each other, and
the fifth terminal and the eight terminal are positioned farther from each other, wherein the first light emitting unit is replaceable with the fourth light emitting unit, the first light emitting unit is unreplaceable with the second light emitting unit, the second light emitting unit is replaceable with the third light emitting unit, the first light emitting unit opposes the third light emitting unit, and the second light emitting unit opposes the fourth light emitting unit.

15. The electronic device of claim 14, wherein the first light emitting unit and the second light emitting unit are positioned adjacent to each other along the first edge, and the third light emitting unit and the fourth light emitting unit are positioned adjacent to each other along the second edge.

* * * * *